United States Patent
Kaneko

(10) Patent No.: US 10,836,973 B2
(45) Date of Patent: Nov. 17, 2020

(54) FREEZER OIL, COMPOSITION FOR FREEZERS, FREEZER, AND METHOD FOR SELECTING FREEZER OIL

(71) Applicant: IDEMITSU KOSAN CO., LTD., Chiyoda-ku (JP)

(72) Inventor: Masato Kaneko, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/763,881

(22) PCT Filed: Oct. 7, 2016

(86) PCT No.: PCT/JP2016/079959
§ 371 (c)(1),
(2) Date: Mar. 28, 2018

(87) PCT Pub. No.: WO2017/061601
PCT Pub. Date: Apr. 13, 2017

(65) Prior Publication Data
US 2018/0282649 A1    Oct. 4, 2018

(30) Foreign Application Priority Data

Oct. 7, 2015    (JP) ................. 2015-199344

(51) Int. Cl.
| | |
|---|---|
| *C10M 107/24* | (2006.01) |
| *C09K 5/04* | (2006.01) |
| *C10M 105/38* | (2006.01) |
| *C10M 107/34* | (2006.01) |
| *F25B 31/00* | (2006.01) |
| *C10N 30/02* | (2006.01) |
| *C10N 30/20* | (2006.01) |
| *C10N 40/30* | (2006.01) |

(52) U.S. Cl.
CPC ............. *C10M 107/24* (2013.01); *C09K 5/04* (2013.01); *C09K 5/045* (2013.01); *C10M 105/38* (2013.01); *C10M 107/34* (2013.01); *F25B 31/002* (2013.01); *C09K 2205/122* (2013.01); *C09K 2205/126* (2013.01); *C09K 2205/22* (2013.01); *C09K 2205/24* (2013.01); *C10M 2207/2835* (2013.01); *C10M 2209/043* (2013.01); *C10N 2030/02* (2013.01); *C10N 2030/20* (2013.01); *C10N 2040/30* (2013.01); *F25B 2500/16* (2013.01)

(58) Field of Classification Search
CPC ...... C09K 5/04; C09K 5/045; C09K 2205/24; C09K 2205/126; C09K 2205/122; C09K 2205/22; C10M 107/24; C10M 107/34; C10M 2209/043; C10M 2207/2835; C10M 105/38; F25B 31/002; F25B 31/38; F25B 2500/16; C10N 2240/30; C10N 2230/20; C10N 2230/02; C10N 2030/02; C10N 2030/20; C10N 2040/30

USPC ................. 252/68; 508/459, 579
See application file for complete search history.

(56) References Cited

U.S. PATENT DOCUMENTS

| | | | | |
|---|---|---|---|---|
| 7,176,169 | B2 * | 2/2007 | Gibb ................ | C10M 111/02 508/485 |
| 8,809,243 | B2 * | 8/2014 | Schmid-Amelunxen ................... | C10M 107/34 508/161 |
| 9,683,190 | B2 * | 6/2017 | Kisen .................. | C10M 107/32 |
| 2002/0137640 | A1 * | 9/2002 | Memita .................. | C07C 67/08 508/485 |
| 2003/0153470 | A1 * | 8/2003 | Lawford ............. | C08G 65/2606 508/199 |
| 2004/0063590 | A1 | 4/2004 | Gibb et al. | |
| 2005/0038283 | A1 * | 2/2005 | Kawahara .............. | C07C 69/75 560/76 |
| 2007/0272893 | A1 * | 11/2007 | Kaneko ............. | C10M 171/008 252/68 |
| 2008/0108850 | A1 * | 5/2008 | Nagao ................. | C10M 107/34 568/675 |
| 2009/0158771 | A1 * | 6/2009 | Low ......................... | C08J 9/146 62/498 |
| 2011/0248206 | A1 * | 10/2011 | Kaneko ............. | C10M 171/008 252/68 |
| 2012/0068104 | A1 * | 3/2012 | Rached ................ | C09K 5/045 252/68 |
| 2012/0068105 | A1 * | 3/2012 | Rached ................ | C09K 5/045 252/68 |
| 2013/0012419 | A1 * | 1/2013 | Matsumoto ........ | C10M 171/008 508/463 |

(Continued)

FOREIGN PATENT DOCUMENTS

| | | |
|---|---|---|
| CN | 1168409 A | 12/1997 |
| CN | 1347867 A | 5/2002 |

(Continued)

OTHER PUBLICATIONS

English translation of JP1998030095, Feb. 3, 1998. (Year: 1998).*
International Search Report dated Nov. 8, 2016 in PCT/JP2016/079959 filed Oct. 7, 2016.
Japanese Office Action dated Oct. 8, 2019 in Japanese Patent Application No. 2017-086364 (with English translation), 8 pages.
Extended European Search Report dated Jun. 5, 2019 in Patent Application No. 16853752.0, 7 pages.

(Continued)

*Primary Examiner* — Douglas J McGinty
(74) *Attorney, Agent, or Firm* — Oblon, McClelland, Maier & Neustadt, L.L.P.

(57) ABSTRACT

A refrigerator oil that is excellent in thermal stability and oxidation stability is provided. The refrigerator oil contains at least one compound selected from the group consisting of a polyvinyl ether compound, a polyoxyalkylene glycol compound, and a polyol ester compound and has a Hazen color number according to ASTM D1209-05 of 0 to 10.

10 Claims, No Drawings

(56) References Cited

U.S. PATENT DOCUMENTS

| | | | |
|---|---|---|---|
| 2013/0092869 A1* | 4/2013 | Boussand | C09K 5/045 252/68 |
| 2013/0099154 A1* | 4/2013 | Boussand | C09K 5/045 252/68 |
| 2013/0299733 A1* | 11/2013 | Boussand | C09K 5/045 252/68 |
| 2014/0131637 A1 | 5/2014 | Sunkara et al. | |
| 2015/0027146 A1* | 1/2015 | Boussand | C09K 5/045 62/84 |
| 2015/0041705 A1* | 2/2015 | Saito | C10M 171/008 252/68 |
| 2015/0076393 A1* | 3/2015 | Saito | C10M 171/008 252/68 |
| 2015/0300698 A1* | 10/2015 | Tanaka | C09K 5/045 62/498 |
| 2017/0260473 A1 | 9/2017 | Kisen et al. | |

FOREIGN PATENT DOCUMENTS

| | | |
|---|---|---|
| CN | 1396246 A | 2/2003 |
| CN | 1494583 A | 5/2004 |
| CN | 1636960 A | 7/2005 |
| CN | 101010420 A | 8/2007 |
| CN | 101291901 A | 10/2008 |
| CN | 101622332 A | 1/2010 |
| CN | 101928216 A | 12/2010 |
| CN | 103890155 A | 6/2014 |
| CN | 104685040 A | 6/2015 |
| JP | 10-30095 | 2/1998 |
| JP | 2002-193882 A | 7/2002 |
| JP | 2005-170998 A | 6/2005 |
| JP | 2007-254607 A | 10/2007 |
| JP | 2009-126979 A | 6/2009 |
| JP | 2012-97638 A | 5/2012 |
| JP | 2013-539797 A | 10/2013 |
| JP | 2014-198854 A | 10/2014 |
| WO | 01/05740 A1 | 1/2001 |
| WO | 2006/022023 A1 | 3/2006 |
| WO | 2007/046196 A1 | 4/2007 |
| WO | 2014/051108 A1 | 4/2014 |
| WO | 2014/069603 A1 | 5/2014 |

OTHER PUBLICATIONS

Office Action in CN Application No. 201680058420.2, dated Jun. 10, 2020.

Chen Weigang, "Refrigeration and Air Conditioning Technology—A General Practice", Apr. 30, 2012, pp. 37-38, Shanghai Science and Technology Press.

Office Action in corresponding Japanese Application No. 2017-086364, dated Mar. 31, 2020. (w/English Translation).

Office Action in corresponding European Application No. 16853752, dated Aug. 14, 2020.

* cited by examiner

FREEZER OIL, COMPOSITION FOR FREEZERS, FREEZER, AND METHOD FOR SELECTING FREEZER OIL

TECHNICAL FIELD

The present invention relates to a refrigerator oil, a composition for a refrigerator, a refrigerator, and a method for selecting a refrigerator oil.

BACKGROUND ART

In general, a refrigerator is constituted by at least a compressor, a condenser, an expansion mechanism (such as an expansion valve), an evaporator, a dryer, and the like, and has such a structure that a mixed liquid of a refrigerant and a lubricating oil (i.e., a refrigerator oil) is circulated in the closed system.

While a chlorine-containing compound, such as a chlorofluorocarbon, has been widely used as the refrigerant for a refrigerator, a compound containing no chlorine, such as a hydrofluorocarbon (HFC), and a natural refrigerant, such as carbon dioxide, are being used instead due to the environmental pollution, such as ozone layer destruction.

As a refrigerator oil for a chlorine-containing Freon refrigerant, a mineral oil and a synthetic hydrocarbon oil, such as an alkylbenzene, have been used. However, these oils have low compatibility with the substitute for the Freon refrigerant, and thus are difficult to exhibit sufficiently the capability as a refrigerator oil.

Under the circumstances, as the refrigerator oil in recent years, a polyvinyl ether compound, a polyoxyalkylene glycol compound, a polyol ester compound, and the like are being widely used (see, for example, PTL 1).

CITATION LIST

Patent Literature

PTL 1: JP 2012-97638 A

SUMMARY OF INVENTION

Technical Problem

In recent years, the amount of the refrigerator oil used in the equipment is being decreased associated with the size reduction of the equipment, which makes the use condition of the refrigerator oil severe, and thus the refrigerator oil is demanded to have higher quality than before. For example, there is a possibility that the refrigerator oil is thermally decomposed through exposure to a locally high temperature condition caused by frictional heat at a sliding portion of a compressor, and the decomposition products thus formed may corrode metallic members and may adversely affect resin members. Accordingly, the refrigerator oil is demanded to have higher stability than before.

A refrigerator oil containing a compound selected from a polyvinyl ether compound, a polyoxyalkylene glycol compound, and a polyol ester compound may be insufficient in thermal stability and oxidation stability in some cases. However, PTL 1 fails to consider the problem.

The present invention has been made in consideration of the problem, and an object thereof is to provide a refrigerator oil that is excellent in thermal stability and oxidation stability.

Solution to Problem

As a result of earnest investigations made by the present inventors, a relationship has been found between the color of a polyvinyl ether compound, a polyoxyalkylene glycol compound, and a polyol ester compound in synthesis, and the thermal stability and the oxidation stability, and thus the present invention has been completed.

The present invention provides the following items (1) to (4).

(1) A refrigerator oil containing at least one compound selected from the group consisting of a polyvinyl ether compound, a polyoxyalkylene glycol compound, and a polyol ester compound, and having a Hazen color number according to ASTM D1209-05 of 0 to 10.

(2) A composition for a refrigerator, containing the refrigerator oil according to the item (1), and a refrigerant.

(3) A refrigerator including the refrigerator oil according to the item (1) or the composition for a refrigerator according to the item (2).

(4) A method for selecting a refrigerator oil, including: measuring a Hazen color number according to ASTM D1209-05 of a refrigerator oil containing at least one compound selected from the group consisting of a polyvinyl ether compound, a polyoxyalkylene glycol compound, and a polyol ester compound; and selecting the refrigerator oil that satisfies a condition of a Hazen color number of 0 to 10.

Advantageous Effects of Invention

According to the present invention, a refrigerator oil that is excellent in thermal stability and oxidation stability, a composition for a refrigerator, and a refrigerator can be provided. According to the present invention, furthermore, a refrigerator oil that is excellent in thermal stability and oxidation stability can be conveniently selected.

DESCRIPTION OF EMBODIMENTS

Embodiments of the present invention will be described below.

<Refrigerator Oil>

The refrigerator oil of the embodiment is a refrigerator oil containing at least one compound selected from the group consisting of a polyvinyl ether compound, a polyoxyalkylene glycol compound, and a polyol ester compound, and having a Hazen color number according to ASTM D1209-05 of from 0 to 10.

The oil containing at least one compound selected from a polyvinyl ether compound, a polyoxyalkylene glycol compound, and a polyol ester compound (which may be hereinafter referred to as an "oil X") may be insufficient in thermal stability and oxidation stability in some cases. The factors making the thermal stability and the oxidation stability of the oil X insufficient have not been sufficiently investigated.

As a result of earnest investigations made by the present inventors, it has been found that in the oil X, an oil that has a Hazen color number according to ASTM D1209-05 (APHA color) of from 0 to 10 can be improved in thermal stability and oxidation stability. Specifically, the oil that has a Hazen color number of from 0 to 10 can suppress the degradation of the oil under a high temperature environment, and thus can suppress the increase of the acid value of the oil, the discoloration of the oil, the corrosion of metals, and the like. An oil that has a Hazen color number exceeding 10 in the oil X cannot be improved in thermal stability and oxidation stability.

It is considered that the reason why the oil that has a Hazen color number exceeding 10 in the oil X cannot be improved in thermal stability and oxidation stability is that "in the case where a by-product is formed in the synthesis process of a polyvinyl ether compound, a polyoxyalkylene glycol compound, and a polyol ester compound, coloration occurs due to the by-product", "it is considered that the coloration is derived from an unsaturated group, a carboxyl group, a ketone group, an aldehyde group, an alcohol group, and the like contained in the by-product, and plural groups of these groups present in the molecule cause the coloration through resonance of unpaired pairs of electrons", and "the by-product tends to degrade by heat or the like, and thus the oil containing the by-product causes the increase of the acid value of the oil, the discoloration of the oil, the corrosion of a metal, and the like, due to the degradation of the by-product". In other words, it is considered that the fact that the oil X has a Hazen color number of from 0 to 10 means that the proportion of the by-product in the oil is small, and the small proportion of the by-product contributes to the thermal stability and the oxidation stability of the oil.

The proportion of the by-product in the oil having a Hazen color number of from 0 to 10 is expected to be approximately less than 1% by mass.

The Hazen color number of the oil X is preferably 0 from the standpoint of the thermal stability and the oxidation stability. A Hazen color number of 0 herein includes the case where the measured value is below the detection limit in the measurement method according to ASTM D1209-05.

[Polyvinyl Ether Compound (PVE)]

The polyvinyl ether compound (PVE) is a polymer having a vinyl ether-derived constituent unit, and specifically, examples thereof include a compound having a constituent unit represented by the following general formula (A-1). The PVE may be used alone, or two or more kinds thereof may be used in combination.

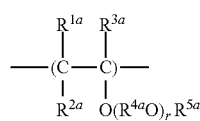

(A-1)

In the general formula (A-1), $R^{1a}$, $R^{2a}$, and $R^{3a}$ each independently represent a hydrogen atom or a hydrocarbon group having 1 to 8 carbon atoms, and the groups may be the same as or different from each other. Specific examples of the hydrocarbon group herein include an alkyl group, such as a methyl group, an ethyl group, an n-propyl group, an isopropyl group, an n-butyl group, an isobutyl group, a sec-butyl group, a tert-butyl group, pentyl groups of every kind, hexyl groups of every kind, heptyl groups of every kind, and octyl groups of every kind; a cycloalkyl group, such as a cyclopentyl group, a cyclohexyl group, methylcyclohexyl groups of every kind, ethylcyclohexyl groups of every kind, and dimethylcyclohexyl groups of every kind; an aryl group, such as a phenyl group, methylphenyl groups of every kind, ethylphenyl groups of every kind, and dimethylphenyl groups of every kind; and an arylalkyl group, such as a benzyl group, phenylethyl groups of every kind, and methylbenzyl groups of every kind, and among those, an alkyl group is preferred.

$R^{1a}$, $R^{2a}$, and $R^{3a}$ are each more preferably a hydrogen atom or an alkyl group having 3 or less carbon atoms, and all of them are most preferably hydrogen atoms.

$R^{4a}$ represents a divalent hydrocarbon group having 2 to 10 carbon atoms. Specific examples of the divalent hydrocarbon group having 2 to 10 carbon atoms herein include a divalent aliphatic hydrocarbon group, such as an ethylene group, a phenylethylene group, a 1,2-propylene group, a 2-phenyl-1,2-propylene group, a 1,3-propylene group, butylene groups of every kind, pentylene groups of every kind, hexylene groups of every kind, heptylene groups of every kind, octylene groups of every kind, nonylene groups of every kind, and decylene groups of every kind; an alicyclic hydrocarbon group having two bonding sites in an alicyclic hydrocarbon, such as cyclohexane, methylcyclohexane, ethylcyclohexane, dimethylcyclohexane, and propylcyclohexane; a divalent aromatic hydrocarbon group, such as phenylene groups of every kind, methylphenylene groups of every kind, ethylphenylene groups of every kind, dimethylphenylene groups of every kind, and naphthylene groups of every kind; an alkyl aromatic hydrocarbon group having a monovalent bonding site in each of an alkyl group moiety and an aromatic moiety of an alkyl aromatic hydrocarbon, such as toluene and ethylbenzene; and an alkyl aromatic hydrocarbon group having bonding sites in an alkyl group moiety of a polyalkyl aromatic hydrocarbon, such as xylene and diethylbenzene. Among those, the aliphatic hydrocarbon group having 2 to 4 carbon atoms is more preferred. Plural groups of $R^{4a}O$ may be the same as or different from each other. In the general formula (A-1), r represents a repetition number, and the average value thereof is preferably from 0 to 10, more preferably from 0 to 5, and further preferably from 0 to 2.

In the general formula (A-1), $R^{5a}$ represents a hydrocarbon group having 1 to 10 carbon atoms. The hydrocarbon group may specifically mean an alkyl group, such as a methyl group, an ethyl group, an n-propyl group, an isopropyl group, an n-butyl group, an isobutyl group, a sec-butyl group, a tert-butyl group, pentyl groups of every kind, hexyl groups of every kind, heptyl groups of every kind, octyl groups of every kind, nonyl groups of every kind, and decyl groups of every kind; a cycloalkyl group, such as a cyclopentyl group, a cyclohexyl group, methylcyclohexyl groups of every kind, ethylcyclohexyl groups of every kind, propylcyclohexyl groups of every kind, and dimethylcyclohexyl groups of every kin; an aryl group, such as a phenyl group, methylphenyl groups of every kind, ethylphenyl groups of every kind, dimethylphenyl groups of every kind, propylphenyl groups of every kind, trimethylphenyl groups of every kind, butylphenyl groups of every kind, and naphthyl groups of every kind; or an arylalkyl group, such as a benzyl group, phenylethyl groups of every kind, methylbenzyl groups of every kind, phenylpropyl groups of every kind, and phenylbutyl groups of every kind.

Among those, a hydrocarbon group having 1 to 8 carbon atoms is preferred, an alkyl group having 1 to 6 carbon atoms is more preferred, and an alkyl group having 1 to 3 carbon atoms is further preferred. The alkyl groups may be any of straight-chain, branched-chain, and cyclic groups.

In the compound having a constituent unit represented by the general formula (A-1), a compound containing a constitutional unit, in which all $R^{1a}$, $R^{2a}$, and $R^{3a}$ are hydrogen atoms, r is 0, and $R^{5a}$ is an ethyl group or a methyl group, is more preferred. More specifically, a compound containing a constitutional unit, in which all $R^{1a}$, $R^{2a}$, and $R^{3a}$ are hydrogen atoms, r is 0, and $R^{5a}$ is an ethyl group or a methyl group, in an amount of 50% by mass or more is preferred, a compound containing the constitutional unit in an amount of 70% by mass or more is more preferred, and a compound containing the constitutional unit in an amount of 80% by mass or more is further preferred.

Examples of the specific compound name of the compound include polyethyl polybutyl vinyl ether, polyethyl vinyl ether, and polymethyl vinyl ether.

The PVE has a constitutional unit represented by the general formula (A-1), and the repetition number thereof may be appropriately selected depending on the target kinetic viscosity. The PVE can be synthesized through homopolymerization of one vinyl ether monomer represented by the following general formula (A-2) or copolymerization of two or more kinds of vinyl ether monomers each represented by the following general formula (A-2).

In the case where the PVE is synthesized in an ordinary method, the resulting PVE may have a Hazen color number exceeding 10. Therefore, after completing the ordinary synthesis reaction, hydrogenation reaction is preferably performed until the Hazen color number becomes 10 or less. It is considered that the unsaturated group, the carboxyl group, the ketone group, the aldehyde group, the alcohol group, and the like in the by-product are hydrogenated through the hydrogenation reaction, so as to enhance the thermal stability and the oxidation stability.

The condition for the hydrogenation reaction may vary depending on the Hazen color number after completing the ordinary synthesis reaction and thus cannot be determined unconditionally, and the condition is preferably a hydrogen pressure of from 0.1 to 10 MPa (preferably from 1 to 6 MPa) and a reaction temperature of from 10 to 250° C. (preferably from 50 to 200° C.). In the hydrogenation reaction, a metallic catalyst, such as a nickel catalyst, a platinum catalyst, a palladium catalyst, and a ruthenium catalyst, a catalyst obtained by supporting the metallic catalyst on alumina, diatom earth, or the like, a Raney catalyst, or the like is preferably used as a catalyst. The hydrogenation reaction of PAG and POE described later may be performed under the same condition.

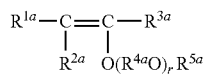

(A-2)

In the formula, $R^{1a}$, $R^{2a}$, $R^{3a}$, $R^{4a}$, $R^{5a}$, and r are the same as those mentioned above.

The vinyl ether monomer includes various monomers corresponding to the aforementioned compounds having a constituent unit represented by the general formula (A-1), and examples thereof include vinyl methyl ether, vinyl ethyl ether, vinyl n-propyl ether, vinyl isopropyl ether, vinyl n-butyl ether, vinyl isobutyl ether, vinyl sec-butyl ether, vinyl tert-butyl ether, vinyl n-pentyl ether, vinyl n-hexyl ether, vinyl 2-methoxyethyl ether, vinyl 2-ethoxyethyl ether, vinyl 2-methoxy-1-methylethyl ether, vinyl 2-methoxypropyl ether, vinyl 3,6-dioxaheptyl ether, vinyl 3,6,9-trioxadecyl ether, vinyl 1,4-dimethyl-3,6-dioxaheptyl ether, vinyl 1,4,7-trimethyl-3,6,9-trioxadecyl ether, vinyl 2,6-dioxa-4-heptyl ether, vinyl 2,6,9-trioxa-4-decyl ether, 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, and 2-tert-butoxy-2-butene. These vinyl ether monomers can be produced by a known method.

The PVE may be a copolymer having a constitutional unit other than the constitutional unit derived from a vinyl ether. Examples of the copolymer include a copolymer having a structure containing a constitutional unit (A) derived from a vinyl ether and a constitutional unit (B) derived from a poly(oxy)alkylene glycol or a monoether thereof.

The poly(oxy)alkylene glycol herein means both a polyalkylene glycol and a polyoxyalkylene glycol.

[Polyoxyalkylene Glycol Compound (PAG)]

Examples of the polyoxyalkylene glycol compound (PAG) include a compound represented by the following general formula (B-1). The PAG may be used alone, or two or more kinds thereof may be used in combination.

$$R^{1b}[OR^{2b})_m\text{—}OR^{3b}]_n \quad (B-1)$$

In the formula, $R^{1b}$ represents a hydrogen atom, a hydrocarbon group having 1 to 10 carbon atoms, an acyl group having 2 to 10 carbon atoms, a hydrocarbon group having 2 to 6 bonding sites and having 1 to 10 carbon atoms, or an oxygen-containing hydrocarbon group having 1 to 10 carbon atoms; $R^{2b}$ represents an alkylene group having 2 to 4 carbon atoms; Rab represents a hydrogen atom, a hydrocarbon group having 1 to 10 carbon atoms, an acyl group having 2 to 10 carbon atoms, or an oxygen-containing hydrocarbon group having 1 to 10 carbon atoms; n represents an integer of 1 to 6; and m represents a number that provides an average value of m×n of from 6 to 80.

In the general formula (B-1), the hydrocarbon group having 1 to 10 carbon atoms in each of $R^{1b}$ and $R^{2b}$ may be any of straight-chain, branched-chain, and cyclic groups. The hydrocarbon group is preferably an alkyl group, and specific examples thereof may include a methyl group, an ethyl group, an n-propyl group, an isopropyl group, butyl groups of every kind, pentyl groups of every kind, hexyl groups of every kind, heptyl groups of every kind, octyl groups of every kind, nonyl groups of every kind, decyl groups of every kind, a cyclopentyl group, and a cyclohexyl group. The hydrocarbon group that has 10 or less carbon atoms may provide good compatibility with a refrigerant. In this point of view, the number of carbon atoms of the hydrocarbon group is more preferably from 1 to 4, further preferably from 1 to 2, and still further preferably 1.

The hydrocarbon group moiety of the acyl group having 2 to 10 carbon atoms in each of $R^{1b}$ and $R^{3b}$ may be any of straight-chain, branched-chain, and cyclic groups. The hydrocarbon group moiety of the acyl group is preferably an alkyl group, and specific examples thereof include alkyl groups having 1 to 9 carbon atoms among the alkyl groups that may be selected as the $R^{1b}$ and $R^{3b}$ described above. The acyl group that has 10 or less carbon atoms may provide good compatibility with a refrigerant. The number of carbon atoms of the acyl group is preferably 2 to 4.

In the case where all $R^{1b}$ and $R^{3b}$ are hydrocarbon groups or acyl groups, $R^{1b}$ and $R^{3b}$ may be the same as or different from each other.

In the case where $R^{1b}$ is the hydrocarbon group having 2 to 6 bonding sites and having 1 to 10 carbon atoms, the hydrocarbon group may be either a chain-like group or a cyclic group. The hydrocarbon group having 2 bonding sites is preferably an aliphatic hydrocarbon group, and examples thereof include an ethylene group, a propylene group, a butylene group, a pentylene group, a hexylene group, a heptylene group, an octylene group, a nonylene group, a decylene group, a cyclopentylene group, and a cyclohexylene group. Examples of the other hydrocarbon groups may include residual groups resulting from removing a hydroxyl group from a bisphenol compound, such as bisphenol, bisphenol F, and bisphenol A. The hydrocarbon group having 3 to 6 bonding sites is preferably an aliphatic hydrocarbon group, and examples thereof may include residual groups resulting from removing a hydroxyl group from a polyhydric alcohol, such as trimethylolpropane, glycerin, pentaerythritol, sorbitol, 1,2,3-trihydroxycyclohexane and 1,3,5-trihydroxycyclohexane.

The aliphatic hydrocarbon group that has 10 or less carbon atoms may provide good compatibility with a refrigerant. The number of carbon atoms of aliphatic hydrocarbon group is preferably 2 to 6.

Examples of the oxygen-containing hydrocarbon group having 1 to 10 carbon atoms in each of $R^{1b}$ and $R^{3b}$ may include an ether bond-containing chain-like or cyclic aliphatic group (for example, a tetrahydrofurfuryl group).

At least one of $R^{1b}$ and $R^{3b}$ is preferably an alkyl group, more preferably an alkyl group having 1 to 4 carbon atoms, further preferably an alkyl group having 1 to 2 carbon atoms, and still further preferably an alkyl group having 1 carbon atom. It is preferred that both $R^{1b}$ and $R^{3b}$ satisfy the aforementioned condition.

$R^{2b}$ in the general formula (B-1) is an alkylene group having 2 to 4 carbon atoms, and examples of the oxyalkylene group as a repeating unit include an oxyethylene group, an oxypropylene group, and an oxybutylene group. The oxyalkylene groups in one molecule may be the same as each other, and two or more kinds of oxyalkylene groups may also be contained. It is preferred that at least an oxypropylene unit is contained in one molecule, and it is more preferred that 50% by mol or more of an oxypropylene unit is contained in the oxyalkylene unit, and it is more preferred that 70% by mol or more of an oxypropylene unit is contained therein.

In the general formula (B-1), n is an integer of 1 to 6 and is determined according to the number of bonding sites of $R^{1b}$. For example, in the case where $R^{1b}$ is an alkyl group or an acyl group, then n is 1; and in the case where $R^{1b}$ is an aliphatic hydrocarbon group having 2, 3, 4, 5, or 6 bonding sites, then n is 2, 3, 4, 5, or 6, respectively.

m is a number providing an average value of m×n of from 6 to 80. The average value that is 80 or less may provide good compatibility with a refrigerant. The average value of m×n is preferably determined in such a manner that the viscosity of the base oil is in the desired range.

n is preferably an integer of 1 to 3, and more preferably 1. In the case where n is 1, it is preferred that any one of $R^{1b}$ and $R^{3b}$ represents an alkyl group, and it is more preferred that both of them each represent an alkyl group. Similarly, in the case where n is 2 or more, it is preferred that any one of plural groups of $R^{3b}$ in one molecule represents an alkyl group, and it is more preferred that all of them each represent an alkyl group.

In the case where n is 2 or more, plural groups of $R^{3b}$ in one molecule may be the same as or different from each other.

The compound represented by the general formula (B-1) may have a hydroxyl group at the end thereof. In the case where the compound has a hydroxyl group at the end thereof, the proportion of the hydroxyl group at the end thereof based on the total end groups is preferably 50% or less.

Examples of the specific compound name of the compound include polypropylene glycol polyethylene glycol dimethyl ether and polypropylene glycol dimethyl ether.

The PAG can be synthesized, for example, by addition-polymerizing an alkylene oxide, such as ethylene oxide and propylene oxide, to an alcohol compound, and then etherifying the end hydroxyl group.

In the case where the PAG is synthesized in an ordinary method, the resulting PAG may have a Hazen color number exceeding 10. Therefore, after completing the ordinary synthesis reaction, hydrogenation reaction is preferably performed until the Hazen color number becomes 10 or less. It is considered that the unsaturated group, the carboxyl group, the ketone group, the aldehyde group, the alcohol group, and the like in the by-product are hydrogenated through the hydrogenation reaction, so as to enhance the thermal stability and the oxidation stability.

<Polyol Ester Compound (POE)>

The polyol ester compound (POE) used is preferably an ester of a diol or a polyol having approximately 3 to 20 hydroxyl groups and a fatty acid having approximately 1 to 24 carbon atoms. The POE may be used alone, or two or more kinds thereof may be used in combination.

In the embodiment, the term "ester" simply shown means a complete ester.

Examples of the diol include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol.

Examples of the polyol include a polyhydric alcohol, such as trimethylolethane, trimethylolpropane, trimethylolbutane, ditrimethylolpropane, tritrimethylolprop ane, pentaerythritol, dip entaerythritol, trip entaerythritol, glycerin, a polyglycerin (e.g., dimer to icosamer of glycerin), 1,3,5-pentanetriol, sorbitol, sorbitan, a sorbitol glycerin condensate, adonitol, arabitol, xylitol, and mannitol; a saccharide, such as xylose, arabinose, ribose, rhamnose, glucose, fructose, galactose, mannose, sorbose, cellobiose, maltose, isomaltose, trehalose, sucrose, raffinose, gentianose, and merenditose; partially etherified products thereof; and a methyl glucoside (glucoside).

The number of carbon atoms of the diol and the polyol is not particularly limited, and the number of carbon atoms is preferably from 3 to 15, more preferably from 4 to 12, and further preferably from 5 to 10.

Among the diols and the polyols, neopentyl glycol, trimethylolethane, trimethylolpropane, trimethylolbutane, ditrimethylolprop ane, tritrimethylolpropane, pentaerythritol, dipentaerythritol, and tripentaerythritol (which may be hereinafter referred to as a "polyhydric alcohol Group A") are preferred.

The fatty acid is not particularly limited, and fatty acid having 1 to 24 carbon atoms is generally used. Among the fatty acids having 1 to 24 carbon atoms, a fatty acid having 3 or more carbon atoms is preferred, a fatty acid having 4 or more carbon atoms is more preferred, and a fatty acid having 5 or more carbon atoms is further preferred, from standpoint of the lubrication capability. A fatty acid having 18 or less carbon atoms is preferred, a fatty acid having 12 or less carbon atoms is more preferred, and a fatty acid having 9 or less carbon atoms is further preferred, from the standpoint of the compatibility with a refrigerant.

The fatty acid may be any of a straight-chain fatty acid and a branched-chain fatty acid, a straight-chain fatty acid is preferred from the standpoint of the lubrication capability, and a branched fatty acid is preferred from the standpoint of the hydrolysis stability. The fatty acid may be any of a saturated fatty acid and an unsaturated fatty acid.

Examples of the fatty acid include a straight-chain or branched fatty acid, such as isobutyric acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, and oleic acid; and a so-called neo acid having a quaternary a carbon atom.

Among these fatty acids, isobutyric acid, valeric acid (n-pentanoic acid), caproic acid (n-hexanoic acid), enanthic acid (n-heptanoic acid), caprylic acid (n-octanoic acid), pelargonic acid (n-nonanoic acid), capric acid (n-decanoic acid), oleic acid (cis-9-octadecenoic acid), isopentanoic acid (3-methylbutanoic acid), 2-methylbutanoic acid, 2-ethylbutanoic acid, 2-methylpentanoic acid, 2-ethylpentanoic acid, 2-methylhexanoic acid, 2-ethylhexanoic acid, and 3,5,5-trimethylhexanoic acid (which may be hereinafter referred to as a "fatty acid Group A") are preferred.

The POE is preferably an ester of at least one selected from the polyhydric alcohol Group A and at least one selected from the fatty acid Group A.

Examples of the specific compound name of the compound include diester of neopentyl glycol with 2-methylpentanoic acid, triester of trimethylolpropane with 3,5,5-trimethylhexanoic acid, tetraester of pentaerythritol with 2-ethylbutanoic acid, tetraester of pentaerythritol with n-pentanoic acid and 2-ethylhexanoic acid, tetraester of pentaerythritol with 2-methylhexanoic acid and 3,5,5-trimethylhexanoic acid, tetraester of pentaerythritol with 2-ethylhexanoic acid, tetraester of pentaerythritol with 3,5,5-trimethylhexanoic acid, hexaester of dipentaerythritol with 2-methylbutanoic acid, hexaester of dipentaerythritol with 2-methylpentanoic acid, and hexaester of dipentaerythritol with 2-ethylehxanoic acid.

The POE can be synthesized by esterification reaction of the diol or the polyol and the fatty acid.

In the case where the POE is synthesized in an ordinary method, the resulting POE may have a Hazen color number exceeding 10. Therefore, after completing the ordinary synthesis reaction, hydrogenation reaction is preferably performed until the Hazen color number becomes 10 or less. It is considered that the unsaturated group, the carboxyl group, the ketone group, the aldehyde group, the alcohol group, and the like in the by-product are hydrogenated through the hydrogenation reaction, so as to enhance the thermal stability and the oxidation stability.

The PVE, the PAG, and the POE each preferably have a weight average molecular weight (Mw) in terms of polystyrene conversion of less than 5,000, more preferably from 200 to 3,000, and further preferably from 250 to 2,000.

The refrigerator oil in the embodiment preferably contains at least one compound selected from the group consisting of the PVE, the PAG, and the POE as a major component. The expression, containing as a major component, herein means that the compound is contained in the refrigerator oil in a proportion of 50% by mass or more.

The content of the compound in the refrigerator oil is more preferably 70% by mass or more, further preferably 90% by mass or more, still further preferably 95% by mass or more, and particularly preferably 97% by mass or more.

In the case where the refrigerator oil contains at least one compound selected from the group consisting of the PVE, the PAG, and the POE as a major component, the compound that constitutes the major component is preferably only one kind of any one of the PVE, the PAG, and the POE. For example, the major component is preferably constituted only by a compound selected from the PVE. In alternative, the major component is preferably constituted only by a compound selected from the PAG. In alternative, the major component is preferably constituted only by a compound selected from the POE.

The refrigerator oil may contain a synthetic oil other than the PVE, the PAG, and the POE (for example, a partial ester, in which the hydroxyl groups of the polyol are not all esterified but remain) and a mineral oil in such a range that does not impair the advantageous effects of the present invention.

[Properties of Refrigerator Oil]

The kinetic viscosity at 40° C. of the refrigerator oil is preferably from 3 to 200 mm$^2$/s, and more preferably from 3 to 150 mm$^2$/s, from the standpoint of the balance between the suppression of lubrication failure and the power loss.

The kinetic viscosity at 100° C. of the refrigerator oil is preferably from 1 to 40 mm$^2$/s, and more preferably from 1 to 25 mm$^2$/s, from the standpoint of the balance between the suppression of lubrication failure and the power loss.

The viscosity index of the refrigerator oil is preferably 50 or more, and more preferably 60 or more.

The kinetic viscosity at 40° C., the kinetic viscosity at 100° C., and the viscosity index can be measured according to JIS K2283:2000.

The acid value of the refrigerator oil is preferably 0.05 mgKOH/g or less, more preferably 0.03 mgKOH/g or less, and further preferably 0.01 mgKOH/g or less, from the standpoint of the stability. The acid value can be measured according to the "indicator titration method" of JIS K2501:2003.

The hydroxyl value of the refrigerator oil is preferably 10 mgKOH/g or less, more preferably 5 mgKOH/g or less, and further preferably 3 mgKOH/g or less, from the standpoint of the stability. The hydroxyl value can be measured according to the "neutralization titration method" of JIS K0070:1992.

The volume resistivity of the refrigerator oil is preferably $2.0\times10^8$ Ω·m or more, more preferably $5.0\times10^8$ Ω·m or more, and further preferably $1.0\times10^9$ Ω·m or more. When the volume resistivity is $2.0\times10^8$ Ω·m or more, the refrigerator oil has increased insulating property, and a leakage current of 1 mA or more, which may be a practical problem, can be prevented from occurring even used in an equipment having an electric driving source, such as an electric car air conditioner.

The water content of the refrigerator oil is preferably less than 1,000 ppm, more preferably 300 ppm or less, and further preferably 150 ppm or less. By decreasing the water content, the refrigerator oil can be prevented from undergoing hydrolysis to enhance the stability of the refrigerator oil, and thus a good lubrication capability can be provide for a prolonged period of time.

<Composition for Refrigerator>

The composition for a refrigerator of the embodiment contains the refrigerator oil of the embodiment and a refrigerant.

[Refrigerant]

Examples of the refrigerant include a fluorinated hydrocarbon refrigerant, a fluorinated ether compound refrigerant, a fluorinated alcohol compound refrigerant, a fluorinated ketone compound refrigerant, and a natural refrigerant. The refrigerant may be used alone, or two or more kinds thereof may be used as a mixture.

Examples of the fluorinated hydrocarbon refrigerant include a saturated fluorinated hydrocarbon refrigerant and an unsaturated fluorinated hydrocarbon refrigerant.

Examples of the saturated fluorinated hydrocarbon refrigerant include difluoromethane (R32), fluoroethane (R161), 1,1,1,2,2-pentafluoroethane (R125), 1,1,1,2-tetrafluoroethane (R134a), 1,1,2,2-tetrafluoroethane (R134), 1,1,1-trifluoroethane (R143a), 1,1,2-trifluoroethane (R143), and 1,1-difluoroethane (R152a). Among these, difluoromethane (R32) is preferred.

Examples of the unsaturated fluorinated hydrocarbon refrigerant include 1,1,2-trifluoroethene (R1123), 1,2,3,3,3-pentafluoropropene (R1225ye), 2,3,3,3-tetrafluoropropene (R1234yf), 1,3,3,3-tetrafluoropropene (R1234ze), 1,2,3,3-tetrafluoropropene (R1234ye), and (Z)-1,1,1,4,4,4-hexafluoro-2-butene (trans-R1336mzz). Among these, 1,1,2-trifluoroethene (R1123) and 2,3,3,3-tetrafluoropropene (R1234yf) are preferred.

Examples of the fluorinated ether compound include hexafluorodimethyl ether, pentafluorothmethyl ether, bis(difluoromethyl) ether, fluoromethyl trifluoromethyl ether, trifluoromethyl methyl ether, difluoromethoxypentafluoroethane, 1-trifluoromethoxy-1,2,2,2-tetrafluoroethane, perfluorooxetane, perfluoro-1,3-dioxolane, isomers of every kind of pentafluorooxetane, and isomers of every kind of tetrafluorooxetane.

Examples of the fluorinated alcohol compound include monofluoromethyl alcohol, difluoromethyl alcohol, trifluoromethyl alcohol, isomers of every kind of difluoroethyl alcohol, isomers of every kind of trifluoroethyl alcohol, isomers of every kind of tetrafluoroethyl alcohol, pentafluoroethyl alcohol, isomers of every kind of difluoropropyl alcohol, isomers of every kind of trifluoropropyl alcohol, a fluorinated propylene glycol, such as hexafluoropropylene glycol, and a fluorinated trimethylene glycol corresponding to the fluorinated propylene glycol.

Examples of the fluorinated ketone compound include hexafluorodimethyl ketone, pentafluorothmethyl ketone, bis(difluoromethyl) ketone, fluoromethyl trifluoromethyl ketone, trifluoromethyl methyl ketone, perfluoromethyl ethyl ketone, and trifluoromethyl 1,1,2,2-tetrafluoroethyl ketone.

Examples of the natural refrigerant include carbon dioxide (carbonic acid gas), a hydrocarbon, such as propane, n-butane, isobutane, 2-methylbutane, n-pentane, cyclopentane-isobutane, and n-butane, and ammonia. Among these, carbon dioxide (carbonic acid gas) is preferred.

Among the refrigerants, at least one selected from the group consisting of difluoromethane (R32) and 2,3,3,3-tetrafluoropropene (R1234yf) is preferred, and a refrigerant containing difluoromethane (R32) alone, a refrigerant containing 2,3,3,3-tetrafluoropropene (R1234yf) alone, and a mixed refrigerant of difluoromethane (R32) and 2,3,3,3-tetrafluoropropene (R1234yf) are particularly preferred from the standpoint of the stability of the refrigerator oil.

The content ratio of the refrigerator oil and the refrigerant (refrigerator oil/refrigerant) in terms of mass ratio is preferably from 1/99 to 99/1, and more preferably from 5/95 to 60/40.

[Additives]

The refrigerator oil and the composition for a refrigerator may contain at least one selected from additives including an antioxidant, an extreme pressure agent, an acid scavenger, an oxygen scavenger, and a copper deactivator. The contents of the additives each are generally from 0.01 to 5% by mass, and preferably from 0.05 to 3% by mass, based on the total amount of the refrigerator oil or the total amount of the composition for a refrigerator.

Examples of the antioxidant include a phenol-based antioxidant, such as 2,6-di-tert-butyl-4-methylphenol, 2,6-di-tert-butyl-4-ethylphenol, 2,2'-methylenebis(4-methyl-6-tert-butylphenol), and 2,6-di-t-butyl-p-cresol; and an amine antioxidant, such as phenyl-α-naphthylamine and N,N'-diphenyl-p-phenylenediamine. Among these, 2,6-di-t-butyl-p-cresol is preferred.

Examples of the extreme pressure agent include a phosphorus extreme pressure agent, such as a phosphate ester, an acidic phosphate ester, a phosphite ester, an acidic phosphite ester, and amine salts thereof; a sulfur extreme pressure agent, such as a sulfurized oil and fat, a sulfurized fatty acid, and a sulfurized ester; and a metal salt of a fatty acid having 3 to 60 carbon atoms. Among these, tricresyl phosphate is preferred.

Examples of the acid scavenger include an epoxy compound, such as phenyl glycidyl ether, an alkyl glycidyl ether, an alkylene glycol glycidyl ether, a glycidyl ester, cyclohexene oxide, an α-olefin oxide, and an epoxidized soybean oil. Among these, 2-ethylhexyl glycidyl ether is preferred.

Examples of the oxygen scavenger include a sulfur-containing aromatic compound, such as 4,4'-thiobis(3-methyl-6-t-butylphenol), diphenyl sulfide, dioctydiphenyl sulfide, a dialkyldiphenylene sulfide, benzothiophene, dibenzothiophene, phenothiazine, benzothiapyrane, thiapyrane, thianthrene, dibenzothiapyrane, and diphenylene disulfide; an aliphatic unsaturated compound, such as various olefins, dienes, and trienes; and a terpene compound having a double bond.

Examples of the copper deactivator include N—[N,N'-dialkyl(e.g., an alkyl group having 3 to 12 carbon atoms) aminomethyl]triazole.

[Properties of Composition for Refrigerator]

The preferred ranges of the kinetic viscosity, the viscosity index, the acid value, the hydroxyl value, the volume resistivity, and the water content of the composition for a refrigerator may be the same as the aforementioned preferred ranges of the refrigerator oil.

<Refrigerator>

The refrigerator of the embodiment includes the aforementioned refrigerator oil of the embodiment or the aforementioned composition for a refrigerator of the embodiment.

The refrigerator of the embodiment is preferably a compression refrigerator. The compression refrigerator preferably has a refrigeration cycle having a condenser, an expansion mechanism (e.g., an expansion valve), and an evaporator, or preferably has a refrigeration cycle having a compressor, a condenser, an expansion mechanism, a dryer, and an evaporator.

The refrigerator oil or the composition for a refrigerator is used, for example, for lubricating a sliding portion provided in the compressor, and the like.

While the sliding portion is not particularly limited, the sliding portion containing a metal, such as iron, as any counterpart thereof is preferred, and the sliding portion where metals slide each other is preferred.

The refrigerator may be used, for example, in a refrigeration system of an air conditioner, a gas heat pump (GHP), an air conditioning system, a refrigeration machine, a refrigeration chamber, an automatic vending machine, a showcase, and the like, a hot water supplying system, a heating system, and the like.

<Method for Selecting Refrigerator Oil>

The method for selecting a refrigerator oil of the embodiment includes: measuring a Hazen color number according to ASTM D1209-05 of a refrigerator oil containing at least one compound selected from the group consisting of a polyvinyl ether compound, a polyoxyalkylene glycol compound, and a polyol ester compound; and selecting the refrigerator oil that satisfies a condition of a Hazen color number of from 0 to 10.

The oil containing a compound selected from a polyvinyl ether compound, a polyoxyalkylene glycol compound, and a polyol ester compound (i.e., the oil X) has not been sufficiently investigated for the reason why the thermal stability and the oxidation stability thereof become insufficient. Therefore, it is necessary to perform a reliability test for the oil X before the shipment.

According to the method for selecting a refrigerator oil of the embodiment, the oil X that is excellent in thermal stability and oxidation stability can be selected by the convenient method, i.e., the measurement of the Hazen color number according to ASTM D1209-05, and thereby the reliability test can be eliminated to enhance the operation efficiency.

The judgement condition of the Hazen color number is preferably from 0 to 10, and more preferably 0. A Hazen color number of 0 herein includes the case where the measured value is below the detection limit in the measurement method according to ASTM D1209-05.

EXAMPLES

The present invention will be described in more specifically with reference to examples below, but the present invention is not limited to the examples.

1. Measurement

The refrigerator oils and the compositions for a refrigerator of Examples and Comparative Examples were subjected to the following measurements. The results are shown in Tables 2 to 5.

1-1. Measurement of Hazen Color Number

The refrigerator oils of Examples and Comparative Examples were measured for Hazen color number according to ASTM D1209-05. The results are shown in Table 2.

1-2. Kinetic Viscosity at 40° C., Kinetic Viscosity at 100° C., and Viscosity Index The refrigerator oils of Examples and Comparative Examples were measured for kinetic viscosity at 40° C., kinetic viscosity at 100° C., and viscosity index according to JIS K2283:2000. The results are shown in Table 2.

1-3. Weight Average Molecular Weight (Mw)

The refrigerator oils of Examples and Comparative Examples were measured for weight average molecular weight (Mw) by using gel permeation chromatography (GPC). In the GPC, the measurement was performed by using two columns of TSKgel SuperMultipore HZ-M, produced by Tosoh Corporation, with tetrahydrofuran as an eluent and a refractive index detector as a detector, and the weight average molecular weight (Mw) was obtained with polystyrene as the standard specimen. The results are shown in Table 2.

1-4. Acid Value

The refrigerator oils of Examples and Comparative Examples were measured for acid value according to the "indicator titration method" of JIS K2501:2003. The results are shown in Table 2. The acid value in the stability tests 1 to 3 described later was also measured by the indicator titration method.

2. Synthesis of Refrigerator Oils 2-1. Synthesis POE 1 to 20

The alcohol compound shown in Table 1-1 in an amount of 1 equivalent in terms of hydroxyl group and the carboxylic acid shown in Table 1-1 in an amount of 1.2 equivalents in terms of carboxyl group were mixed in a flask, and esterified by reacting under a nitrogen atmosphere at ordinary pressure and 230° C. for 15 hours, thereby providing a composition A. The unreacted carboxylic acid was removed from the composition A, activated white clay was added thereto to perform an adsorption treatment, and the activated white clay was removed with a filter, so that the acid value of the composition was adjusted to 0.03 or less, thereby providing POE 11 to 20.

The POE 11 to 20 were subjected to hydrogenation reaction (reaction temperature: 100° C., hydrogen pressure: 3.5 MPa, catalyst: nickel-diatom earth) until the Hazen color number became the value shown in Table 2, thereby providing POE 1 to 10.

TABLE 1-1

| | | Raw materials | |
|---|---|---|---|
| | Compound name | Alcohol compound | Carboxylic acid |
| POE1 POE11 | diester of neopentyl glycol and 2-methylpentanoic acid | neopentyl glycol | 2-methylpentanoic acid |
| POE2 POE12 | triester of trimethylolpropane and 3,5,5-trimethylhexanoic acid | trimethylolpropane | 3,5,5-trimethylhexanoic acid |
| POE3 POE13 | tetraester of pentaerythritol and 2-ethylbutanoic acid | pentaerythritol | 2-ethylbutanoic acid |
| POE4 POE14 | tetraester of pentaerythritol and carboxylic acid mixture | pentaerythritol | carboxylic acid mixture (n-pentanoic acid: 25% by mol, 2-ethylhexanoic acid: 75% by mol) |
| POE5 POE15 | tetraester of pentaerythritol and carboxylic acid mixture | pentaerythritol | carboxylic acid mixture (2-methylhexanoic acid: 50% by mol, 3,5,5-trimethylhexanoic acid: 50% by mol) |
| POE6 POE16 | tetraester of pentaerythritol and 2-ethylhexanoic acid | pentaerythritol | 2-ethylhexanoic acid |
| POE7 POE17 | tetraester of pentaerythritol and 3,5,5-trimethylhexanoic acid | pentaerythritol | 3,5,5-trimethylhexanoic acid |
| POE8 POE18 | hexaester of dipentaerythritol and 2-methylbutanoic acid | dipentaerythritol | 2-methylbutanoic acid |
| POE9 POE19 | hexaester of dipentaerythritol and 2-methylpentanoic acid | dipentaerythritol | 2-methylpentanoic acid |

TABLE 1-1-continued

|  | Raw materials | |
|---|---|---|
| Compound name | Alcohol compound | Carboxylic acid |
| POE10 hexaester of dipentaerythritol and 2-ethylhexanoic acid | dipentaerythritol | 2-ethylhexanoic acid |
| POE20 | | |

2-2. Synthesis of PAG 1 to 4

100 parts of methanol was placed in an airtight vessel, followed by substituting with nitrogen, to which the alkylene oxide shown in Table 1-2 was injected along with 5 parts of potassium hydroxide, and the materials were polymerized at 110 to 140° C. until the weight average molecular weight shown in Table 2 was obtained, thereby providing a polyalkylene glycol monomethyl ether. Sodium methoxide was added thereto in an amount of 1.05 mol per 1 mol of the polyalkylene glycol monomethyl ether, and methanol elimination was performed at 130° C. in nitrogen gas under a pressure of 2.7 kPa. After reacting for 4 hours, methylene dichloride was injected in an amount of 0.54 mol per 1 mol of the polyalkylene glycol monomethyl ether over 3 hours, and the mixture was aged for 2 hours and agitated at 120 to 140° C., thereby providing a composition B. The composition B was filtered along with 0.2 part of Radiolite as a filtering assistant, and the acid value was adjusted to 0.03 or less, thereby providing PAG 3 and 4.

PAG 3 and 4 were subjected to hydrogenation reaction (reaction temperature: 140° C., hydrogen pressure: 3.5 MPa, catalyst: nickel-diatom earth) until the Hazen color number became the value shown in Table 1, thereby providing PAG 1 and 2.

TABLE 1-2

| Compound name | Raw material (alkylene oxide) |
|---|---|
| PAG 1 PAG 3 | polypropylene glycol |
| | alkylene oxide acid mixture (propylene oxide: 80% by mol, ethylene oxide: 20% by mol) |
| | polyethylene glycol (8/2) methyl ether |
| PAG 2 PAG 4 | propylene glycol dimethyl ether |
| | propylene oxide |

2-3. Synthesis of PVE 1 to 6

To a 1 L glass flask equipped with an agitator, 106 g of toluene, 24.3 g of ethanol, and 0.2 g of boron trifluoride diethyl ether complex each were added. To a conical flask separately provided, 400 g of the vinyl ether monomer shown in Table 1-3 was added.

After starting the agitator, the vinyl ether monomer in the conical flask was fed to the system agitated in the 1 L flask with a pump at 5 mL/min, and the pump was once stopped after 46 g of the vinyl ether monomer had been fed.

After confirming the temperature rise of the system in the 1 L flask, the pump was again driven to feed the remaining vinyl ether monomer to the system agitated in the 1 L flask over 4 hours, and the agitation was further continued for 5 minutes after completing the feeding, thereby providing a composition C. During feeding the vinyl ether monomer, the system was consistently agitated, and the temperature of the system was controlled to 25° C. with a water bath.

Activated white clay was added to the composition C to perform an adsorption treatment, the activated white clay was removed with a filter, and further the unreacted vinyl ether monomer and the solvent were removed, so that the acid value of the composition was adjusted to 0.03 or less, thereby providing PVE 4 to 6.

PVE 4 to 6 were subjected to hydrogenation reaction (reaction temperature: 140° C., hydrogen pressure: 3.5 MPa, catalyst: nickel-diatom earth) until the Hazen color number became the value shown in Table 2, thereby providing PVE 1 to 3.

TABLE 1-3

| Compound name | Raw material (vinyl ether monomer) |
|---|---|
| PVE 1 | polyethyl vinyl ether monomer mixture (vinyl ethyl ether: 80% by mol, vinyl butyl ether: 20% by mol) |
| PVE 4 | polybutyl (8/2) vinyl ether |
| PVE 2 | polyethyl vinyl ether |
| PVE 5 | ether |
| PVE 3 | polymethyl vinyl ether |
| PVE 6 | vinyl ether |

TABLE 2

| | Hazen color number | Kinetic viscosity at 40° C. | Kinetic viscosity at 100° C. | Viscosity index | Mw | Acid value mgKOH/g |
|---|---|---|---|---|---|---|
| POE 1 | 0 | 3.95 | 1.42 | 64 | 300 | 0.01 |
| POE 2 | 0 | 51.50 | 7.10 | 94 | 554 | 0.01 |
| POE 3 | 10 | 43.70 | 5.86 | 63 | 528 | 0.01 |
| POE 4 | 0 | 66.80 | 8.10 | 85 | 598 | 0.01 |
| POE 5 | 10 | 59.70 | 7.90 | 97 | 640 | 0.01 |
| POE 6 | 0 | 45.10 | 6.30 | 82 | 640 | 0.01 |
| POE 7 | 0 | 110.80 | 11.00 | 80 | 696 | 0.01 |
| POE 8 | 0 | 59.30 | 8.90 | 127 | 758 | 0.01 |
| POE 9 | 0 | 79.60 | 10.30 | 112 | 842 | 0.01 |
| POE 10 | 10 | 141.70 | 14.52 | 101 | 1010 | 0.01 |
| PAG 1 | 0 | 110.40 | 20.41 | 229 | 1800 | 0.00 |
| PAG 2 | 10 | 48.83 | 10.66 | 216 | 1300 | 0.00 |
| PVE 1 | 0 | 34.40 | 5.23 | 72 | 640 | 0.00 |
| PVE 2 | 0 | 70.20 | 8.35 | 85 | 720 | 0.00 |
| PVE 3 | 0 | 69.50 | 8.35 | 87 | 720 | 0.00 |
| POE 11 | 20 | 3.97 | 1.42 | 61 | 300 | 0.01 |
| POE 12 | 30 | 52.30 | 7.15 | 93 | 554 | 0.01 |
| POE 13 | 40 | 44.50 | 5.88 | 61 | 528 | 0.01 |
| POE 14 | 300< | 65.20 | 7.95 | 84 | 598 | 0.01 |
| POE 15 | 300< | 62.10 | 8.10 | 97 | 640 | 0.01 |
| POE 16 | 300 | 46.50 | 6.39 | 81 | 640 | 0.01 |
| POE 17 | 300< | 113.50 | 11.20 | 81 | 696 | 0.01 |
| POE 18 | 300 | 61.40 | 9.12 | 126 | 758 | 0.01 |
| POE 19 | 300< | 80.50 | 10.40 | 112 | 842 | 0.01 |
| POE 20 | 300< | 143.20 | 14.60 | 101 | 1010 | 0.01 |
| PAG 3 | 300 | 31.75 | 7.43 | 213 | 900 | 0.01 |
| PAG 4 | 300< | 47.77 | 10.50 | 217 | 1300 | 0.00 |
| PVE 4 | 300 | 71.30 | 8.34 | 82 | 720 | 0.00 |
| PVE 5 | 300 | 34.40 | 5.23 | 72 | 530 | 0.00 |
| PVE 6 | 300 | 50.26 | 6.74 | 83 | 650 | 0.00 |

The following stability tests were performed with the refrigerator oils synthesized in the items 2-1 to 2-3.

Examples 1-1 to 1-15 and Comparative Examples 1-1 to 1-15

<Stability Test 1 (Sealed Tube Test 1)>

In a glass tube, 4 mL of the refrigerator oil shown in Table 3, 1 g of a refrigerant (R32), additives (1 part by mass of tricresyl phosphate, 0.5 part by mass of 2,6-di-t-butyl-p-cresol, and 1 part by mass of 2-ethylhexyl glycidyl ether, per 100 parts by mass of the refrigerator oil), and a metallic catalyst (iron, copper, and aluminum) were charged, and the tube was sealed and retained under conditions of an air pressure of 6.7 kPa and a temperature of 175° C. for 10 days. Thereafter, the acid value of the composition for a refrigerator in the glass tube was measured, and the appearance of the oil and the appearance of the iron catalyst were visually evaluated. The water content of the composition for a refrigerator in the glass tube was controlled to 50 ppm or less. The results are shown in Table 3.

TABLE 3

| | Refrigerator oil | | Sealed tube test 1 | | |
|---|---|---|---|---|---|
| | Oil species | Hazen color number | Appearance of oil | Appearance of catalyst | Acid value mgKOH/g |
| Example 1-1 | POE 1 | 0 | good | good | 0.02 |
| Example 1-2 | POE 2 | 0 | good | good | 0.02 |
| Example 1-3 | POE 3 | 10 | good | good | 0.02 |
| Example 1-4 | POE 4 | 0 | good | good | 0.02 |
| Example 1-5 | POE 5 | 10 | good | good | 0.02 |
| Example 1-6 | POE 6 | 0 | good | good | 0.02 |
| Example 1-7 | POE 7 | 0 | good | good | 0.02 |
| Example 1-8 | POE 8 | 0 | good | good | 0.02 |
| Example 1-9 | POE 9 | 0 | good | good | 0.02 |
| Example 1-10 | POE 10 | 10 | good | good | 0.02 |
| Example 1-11 | PAG 1 | 0 | good | good | 0.01 |
| Example 1-12 | PAG 2 | 10 | good | good | 0.01 |
| Example 1-13 | PVE 1 | 0 | good | good | 0.01 |
| Example 1-14 | PVE 2 | 0 | good | good | 0.01 |
| Example 1-15 | PVE 3 | 0 | good | good | 0.01 |
| Comparative Example 1-1 | POE 11 | 20 | pale yellow | Fe black | 0.07 |
| Comparative Example 1-2 | POE 12 | 30 | pale yellow | Fe black | 0.09 |
| Comparative Example 1-3 | POE 13 | 40 | pale yellow | Fe black | 0.12 |
| Comparative Example 1-4 | POE 14 | 300< | yellow | Fe black | 0.13 |
| Comparative Example 1-5 | POE 15 | 300< | yellow | Fe black | 0.25 |
| Comparative Example 1-6 | POE 16 | 300 | yellow | Fe black | 0.10 |
| Comparative Example 1-7 | POE 17 | 300< | yellow | Fe black | 0.27 |
| Comparative Example 1-8 | POE 18 | 300 | yellow | Fe black | 0.09 |
| Comparative Example 1-9 | POE 19 | 300< | yellow | Fe black | 0.23 |
| Comparative Example 1-10 | POE 20 | 300< | yellow | Fe black | 0.31 |
| Comparative Example 1-11 | PAG 3 | 300< | yellow | good | 0.08 |
| Comparative Example 1-12 | PAG 4 | 300< | yellow | good | 0.05 |
| Comparative Example 1-13 | PVE 4 | 300 | yellow | good | 0.04 |
| Comparative Example 1-14 | PVE 5 | 300 | yellow | good | 0.05 |
| Comparative Example 1-15 | PVE 6 | 300 | yellow | good | 0.09 |

Examples 2-1 to 2-6 and Comparative Examples 2-1 to 2-6

<Stability Test 2 (Sealed Tube Test 2)>

The acid value of the composition for a refrigerator, the appearance of the oil, and the appearance of the iron catalyst were evaluated in the same manner as in the stability test 1 except that the refrigerator oil was changed to that shown in Table 4, the refrigerant was changed to a mixture of R32 and R1234yf at a ratio of 1/1 (by mass), and the amount of 2-ethylhexyl glycidyl ether added was changed to 1.5 parts by mass per 100 parts by mass of the refrigerator oil. The results are shown in Table 4.

TABLE 4

| | Refrigerator oil | | Sealed tube test 2 | | |
|---|---|---|---|---|---|
| | Oil species | Hazen color number | Appearance of oil | Appearance of catalyst | Acid value mgKOH/g |
| Example 2-1 | POE 2 | 0 | good | good | 0.03 |
| Example 2-2 | POE 5 | 10 | good | good | 0.03 |
| Example 2-3 | POE 7 | 0 | good | good | 0.03 |
| Example 2-4 | POE 10 | 10 | good | good | 0.03 |
| Example 2-5 | PAG 2 | 10 | good | good | 0.02 |
| Example 2-6 | PVE 2 | 0 | good | good | 0.02 |
| Comparative Example 2-1 | POE 12 | 30 | pale yellow | Fe black | 0.12 |
| Comparative Example 2-2 | POE 15 | 300< | yellow | Fe black | 0.35 |
| Comparative Example 2-3 | POE 17 | 300< | yellow | Fe black | 0.34 |
| Comparative Example 2-4 | POE 20 | 300< | yellow | Fe black | 0.43 |
| Comparative Example 2-5 | PAG 4 | 300< | yellow | good | 0.08 |
| Comparative Example 2-6 | PVE 4 | 300 | yellow | good | 0.05 |

Examples 3-1 to 3-6 and Comparative Examples 3-1 to 3-6

<Stability Test 3 (Sealed Tube Test 3)>

The acid value of the composition for a refrigerator, the appearance of the oil, and the appearance of the iron catalyst were evaluated in the same manner as in the stability test 1 except that the refrigerator oil was changed to that shown in Table 5, the refrigerant was changed to R1234yf, and the amount of 2-ethylhexyl glycidyl ether added was changed to 3 parts by mass per 100 parts by mass of the refrigerator oil. The results are shown in Table 5.

TABLE 5

| | Refrigerator oil | | | Sealed tube test 3 | |
|---|---|---|---|---|---|
| | Oil species | Hazen color number | Appearance of oil | Appearance of catalyst | Acid value mgKOH/g |
| Example 3-1 | POE 2 | 0 | good | good | 0.05 |
| Example 3-2 | POE 5 | 10 | good | good | 0.05 |
| Example 3-3 | POE 7 | 0 | good | good | 0.05 |
| Example 3-4 | POE 10 | 10 | good | good | 0.05 |
| Example 3-5 | PAG 2 | 10 | good | good | 0.03 |
| Example 3-6 | PVE 2 | 0 | good | good | 0.03 |
| Comparative Example 3-1 | POE 12 | 30 | pale yellow | Fe black | 0.15 |
| Comparative Example 3-2 | POE 15 | 300< | yellow | Fe black | 0.40 |
| Comparative Example 3-3 | POE 17 | 300< | yellow | Fe black | 0.45 |
| Comparative Example 3-4 | POE 20 | 300< | yellow | Fe black | 0.52 |
| Comparative Example 3-5 | PAG 4 | 300< | yellow | good | 0.12 |
| Comparative Example 3-6 | PVE 4 | 300 | yellow | good | 0.09 |

It is confirmed from the results in Tables 1 to 3 that the refrigerator oil containing at least one compound selected from the group consisting of a polyvinyl ether compound, a polyoxyalkylene glycol compound, and a polyol ester compound, and having a Hazen color number according to ASTM D1209-05 of from 0 to 10 can suppress the degradation of the oil under a high temperature environment, and thus can suppress the increase of the acid value of the oil, the discoloration of the oil, the corrosion of the metal, and the like, and the refrigerator oil is excellent in thermal stability and oxidation stability.

The invention claimed is:

1. A composition for a refrigerator, the composition comprising:
refrigerator oil, comprising at least one compound selected from the group consisting of a polyvinyl ether compound and a polyoxyalkylene glycol compound, and having a Hazen color number according to ASTM D1209-05 of 0; and
at least one refrigerant selected from the group consisting of difluoromethane and 2,3,3,3-tetrafluoropropene,
wherein the refrigerator oil has an acid value of 0.05 mgKOH/g or less.

2. The composition according to claim 1, wherein the refrigerator oil has a kinetic viscosity at 40° C. of 3 to 200 mm$^2$/s.

3. The composition according to claim 1, wherein the refrigerator oil has an acid value of 0.03 mgKOH/g or less.

4. The composition according to claim 1, wherein the composition further comprises at least one additional refrigerant selected from the group consisting of a saturated fluorinated hydrocarbon refrigerant and an unsaturated fluorinated hydrocarbon refrigerant.

5. The composition according to claim 1, further comprising at least one selected from the group consisting of an antioxidant, an extreme pressure agent, an acid scavenger, an oxygen scavenger, and a copper deactivator.

6. A refrigerator, comprising the composition according to claim 1.

7. The composition according to claim 1, wherein the refrigerant is difluoromethane.

8. The composition according to claim 1, wherein the refrigerant is 2,3,3,3-tetrafluoropropene.

9. The composition according to claim 1, wherein the refrigerator oil comprises the polyvinyl ether compound, and a content of the polyvinyl ether compound in the refrigerator oil is 70 mass % or more, based on a total mass of the refrigerator oil.

10. The composition according to claim 1, wherein the refrigerator oil comprises the polyoxyalkylene glycol compound, and a content of the polyoxyalkylene glycol compound in the refrigerator oil is 70 mass % or more, based on a total mass of the refrigerator oil.

* * * * *